(12) United States Patent
Stein et al.

(10) Patent No.: US 11,805,940 B2
(45) Date of Patent: Nov. 7, 2023

(54) FOOD PROCESSOR FOR CONTROLLING ANOTHER HOUSEHOLD APPLIANCE

(71) Applicant: Vorwerk & Co. Interholding GmbH, Wuppertal (DE)

(72) Inventors: Matthias Stein, Mülheim an der Ruhr (DE); Marcelo Caballero, Wädenswil (CH); Matthias Ludwig, Mettmann (DE); Felix Bruns, Bochum (DE)

(73) Assignee: Vorwerk & Co. Interholding GmbH

( * ) Notice: Subject to any disclaimer, the term of this patent is extended or adjusted under 35 U.S.C. 154(b) by 296 days.

(21) Appl. No.: 17/060,024

(22) Filed: Sep. 30, 2020

(65) Prior Publication Data

US 2021/0093123 A1    Apr. 1, 2021

(30) Foreign Application Priority Data

Oct. 1, 2019   (EP) .................................... 19200818

(51) Int. Cl.
| | | |
|---|---|---|
| *A47J 36/32* | (2006.01) | |
| *D06F 34/28* | (2020.01) | |
| *A47J 43/07* | (2006.01) | |
| *A47J 44/00* | (2006.01) | |
| *G05B 19/4155* | (2006.01) | |
| *H05B 6/64* | (2006.01) | |

(52) U.S. Cl.
CPC ............. *A47J 36/321* (2018.08); *A47J 43/07* (2013.01); *A47J 44/00* (2013.01); *D06F 34/28* (2020.02); *G05B 19/4155* (2013.01); *H05B 6/6435* (2013.01); *A47J 2043/0733* (2013.01); *G05B 2219/45111* (2013.01)

(58) Field of Classification Search
CPC .......... A47J 36/321; A47J 43/07; A47J 44/00; A47J 2043/0733; A47J 27/004; A47J 43/0727; A47J 36/10; A47J 43/0716; A47J 27/04; A47J 2027/043; H05B 6/6435
USPC .......... 99/325, 344, 352, 467; 219/431, 435, 219/436, 440, 441, 442, 516
See application file for complete search history.

(56) References Cited

U.S. PATENT DOCUMENTS

2017/0347838 A1* 12/2017 Kraut-Reinkober ........................
A47J 27/004

FOREIGN PATENT DOCUMENTS

| DE | 102011007427 A1 | 10/2012 |
| DE | 102014119315 A1 | 6/2016 |
| EP | 3415061 A1 | 12/2018 |

\* cited by examiner

*Primary Examiner* — Phuong T Nguyen
(74) *Attorney, Agent, or Firm* — Barnes & Thornburg LLP

(57) ABSTRACT

A food processor for preparing a food includes a food preparation space with one or more devices for preparing the food in the food preparation space. The food processor also includes at least one interface for connecting the food processor to another household appliance and a user interface unit for providing user interfaces. The food processor includes a control unit for providing control programs and a communication unit for providing communication channels.

18 Claims, 2 Drawing Sheets

FOOD PROCESSOR FOR CONTROLLING ANOTHER HOUSEHOLD APPLIANCE

CROSS REFERENCE TO RELATED APPLICATIONS

This application claims priority to and the benefit of European Patent Application No. 19200818.3, filed 1 Oct. 2019, the disclosure of which is now expressly incorporated herein by reference.

FIELD OF THE DISCLOSURE

The present disclosure relates to a food processor for preparing a food in a food preparation space. The preparation of a food in the sense of the present disclosure also includes the preparation of a beverage. The present disclosure also relates to the preparation of foods.

BACKGROUND

A Thermomix® food processor is known for semi-automated preparation of a food, which can access recipes stored in an electronic memory to prepare a food. To prepare a food, a user follows the recipe steps successively in the order given by a selected recipe. In contrast to cooking according to a cookbook, however, a user does not necessarily have to set each operating parameter of the food processor manually. Instead, it is possible for the Thermomix® to set operating parameters in an automated manner as part of a recipe step. For example, a temperature in a vessel of the Thermomix® used as a food preparation space can be set in an automated manner as an operating parameter. For example, a stirring speed of the mixing tool of the food processor can be set in an automated manner as an operating parameter. A time period can be set in an automated manner as an operating parameter for heating or stirring. An activation of a scale can also be an operating parameter, which is set in an automated manner as soon as an ingredient is to be filled into the cooking vessel. Since at least some operating parameters can be set in an automated manner, this is a food processor for preparation of food in a semi-automated manner.

If a scale is to be activated on the Thermomix® food processor, the user can activate this function manually. After activation, a related graphical user interface is displayed on the Thermomix® food processor screen. The graphical user interface related to the scale can only be used for the Thermomix® food processor scale. The control program used for the scale only communicates with the scale present in the food processor.

If a stirring speed for the stirring tool is to be set on the Thermomix® food processor, the user can manually select a stirring speed and manually activate the stirring. A related graphical user interface is then displayed on the Thermomix® food processor screen and the stirring tool is rotated at the selected stirring speed. This graphical user interface related to the stirring tool can only be used for the mixing tool of the Thermomix® food processor.

The same applies to other user interfaces and devices of the Thermomix® food processor. The Thermomix® food processor is not intended or suitable for making changes to these links or user interfaces or to be able to change them with little technical effort. Such links and user interfaces which are not intended and suitable for changes and which serve to control and operate the food processor are hereinafter referred to as native.

There is a household appliance known as HestanCue™, which comprises a hob and a frying pan. A food can be prepared by means of the household appliance by guiding a user according to recipe steps how to prepare a food. The instructions are shown on the display of a mobile phone. The HestanCue™ household appliance can automatically control temperature and cooking time when preparing a food. The HestanCue™ household appliance is therefore also a food processor that can prepare food in a semi-automated manner.

A method and a control unit for monitoring a production process of a food mass is known from the publication DE 10 2016 219 972 A1. A method for supporting a food preparation process is described in publication EP 3 252 729 A1. Furthermore, an assistance system is known from this. Publication EP 2 901 903 A1 discloses a method for operating a food processor and a food processor.

It is the task of the present disclosure to provide a further developed food processor.

SUMMARY

A food processor is an appliance which is typically used in a kitchen. A kitchen is one of the rooms in a household in which people spend a lot of time when household activities are performed. A kitchen is therefore a place where a large number of household appliances are used. A food processor is therefore a particularly suitable appliance for centrally operating and controlling other household appliances by means of the food processor. Household appliances also include appliances that can and/or should be used in an associated garden, such as a gas barbecue.

DETAILED DESCRIPTION

In the following, the present disclosure is explained in more detail by means of figures.

The scope of protection of the claims is not limited to the examples shown in the figures.

Figure 1:
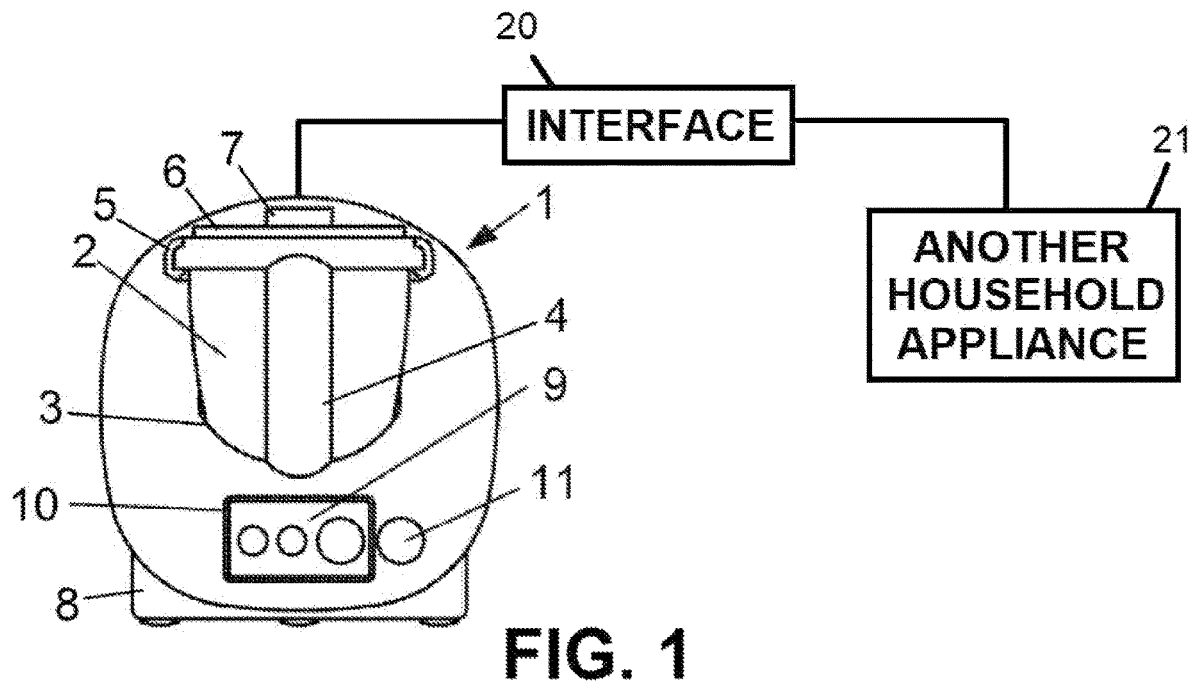
FIG. 1: Schematic representation of a food processor.

FIG. 1 shows a food processor 1. The food processor 1 comprises as food preparation space a vessel 2, which is inserted into a holder 3 of the food processor 1. The vessel 2 comprises a handle 4 to easily remove the vessel 2 from the holder 3. The food processor comprises a closing mechanism with pivoted arms 5. In the closed position shown in FIG. 1, the arms 5 enclose a lid 6. Thus, the lid 6 is firmly attached to the vessel 2. The lid 6 comprises an opening into which a transparent vessel 7 is inserted. The opening in the lid 6 is closed by the vessel 7. The transparent vessel 7 can be lifted off the opening at any time, so that an opening is provided through which an ingredient can be filled into the vessel 2. The transparent vessel 7 can be used as a dosing aid. When the closing mechanism is opened, the lid 6 can be removed from the vessel 2. The food processor 1 comprises a base 8 for placement.

A user interface 9 is displayed on a screen 10. The screen 10 is preferably touch-sensitive in order to be able to set for example operating parameters by touching the screen. The food processor may additionally comprise, for example, a rotary control 11, which can also serve for setting one or more operating parameters in conjunction with the user interface 9. For example, if the user interface 9 is related to a stirring tool of the food processor 1 or to a stirring tool in another household appliance 21, the rotary control 11 can be used to set a rotation speed. For example, if user interface 9 is related to heating the vessel 2 of the food processor 1 or to heating a food preparation space of another household appliance 21, the rotary control 11 can be used to set a desired temperature. It may therefore be advantageous not to operate and control food processor 1 or another household appliance 21 entirely via a user interface provided by a user interface unit of food processor 1. Instead of a rotary control, however, a slide control can be provided, for example, where operating parameters such as temperature, stirring speed or a time period can thus be set by a sliding movement. However, a rotary control 11 is preferable, since large ranges can be set without having to provide too much space. The rotary control can be configured alternatively or additionally as a pressure element. A pressure element means that it can be pressed to trigger an action, such as starting a preparation of one or more foods.

The food processor 1 shown in FIG. 1 comprises an interface 20 for connecting food processor 1 to another household appliance 21. The food processor 1 shown in FIG. 1 is configured such that an HTML page can be displayed on screen 10. The food processor 1 can therefore process HTML.

Figure 2:
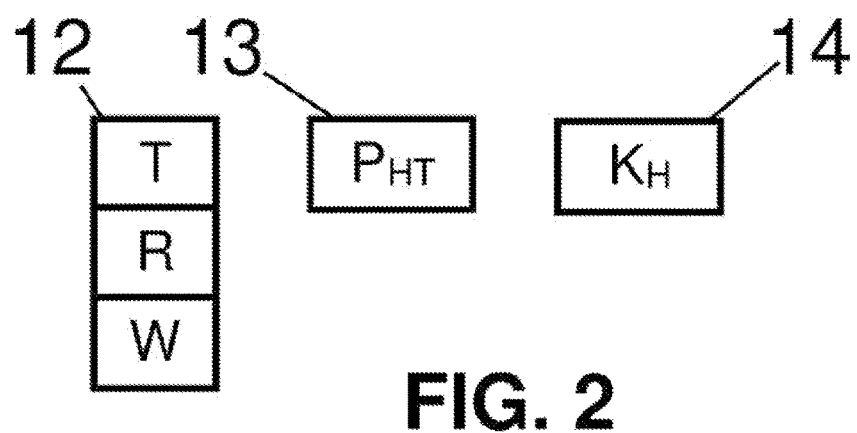
FIG. 2: Structure of units.

As shown in FIG. 2, food processor 1 comprises a user interface unit 12 for providing three different user interfaces T, R and W. Food processor 1 comprises a control unit 13 for providing a control program $P_{HT}$. Food processor 1 comprises a communication unit 14 for providing a communication channel $K_H$.

The user interface T allows to set a temperature for a food preparation space. For example, a temperature of 50° C. can be set. The food preparation space is then heated up to 50° C. Further, a time period can be set. For example, if 10 minutes is set, the food preparation space is heated for 10 minutes. The temperature and/or time period can be set by actuating the graphical user interface T, which is displayed on the screen 10, which is at least then touch-sensitive. However, it is also possible that the display of the user interface T on screen 10 is accompanied by the possibility of setting the temperature and/or time period by means of the rotary control 11, for example.

The user interface R allows to set a stirring speed for a stirring tool in a food preparation space. For example, a stirring speed of level 5 out of 10 possible levels can be set. The stirring tool is then rotated at a speed corresponding to level 5. A time period can also be set. For example, if 10 seconds is set, the stirring tool is rotated for 10 seconds. Setting the stirring speed and/or the time period can be enabled through the graphical user interface R, which is displayed on screen 10. However, it is also possible that the display of the user interface R on screen 10 is accompanied by the possibility of setting the temperature, stirring speed and/or time period by means of the rotary control 11, for example.

The user interface W allows to use a scale to weigh the weight of ingredients that are brought into a food preparation space after the scale is activated. The graphical user interface W can be displayed on screen 10. The weight of an ingredient brought into the food preparation space can be displayed on the graphical user interface W.

The temperature for a food preparation space of another household appliance 21 can be set in a controlled manner using the control program $P_{HT}$, which is provided by the control unit 13. For example, the other household appliance H is a hob with a pan.

The food processor 1 can communicate with the other household appliance H via the communication channel $K_H$ provided by communication unit 14.

In addition to the T, R and W interfaces, there may be a user interface that allows to select recipes from a list of recipes. For example, a user can select a first recipe for the food processor and a second recipe for the other household appliance from a list after opening this user interface. After selection the user can then activate the preparation according to the two selected recipes. The food processor can now be configured such that the two recipes are processed in a coordinated manner. For example, according to a first recipe step of the first recipe, a first ingredient must be filled into the food preparation space 2 of food processor 1. The user interface W for the scale therefore appears on screen 10 of food processor 1. The user now fills the first ingredient into the food preparation space 2 of food processor 1. If the first ingredient has been filled in the quantity specified according to the first recipe, food processor 1 recognizes this in an automated manner. For example, a second recipe step of the first recipe can then be displayed on screen 10. According to the second recipe step, it may be planned to fill a second ingredient in the quantity according to the first recipe into food preparation space 2. This is then done in the same way as for the first ingredient. If food processor 1 recognizes that the second ingredient has been completely filled in it can now be planned, according to a third recipe step, that the two ingredients are to be mixed with each other, for example at level 4 for 10 seconds. On screen 10, the user interface R can be now displayed, which allows the user to confirm that stirring is to be carried out for 10 seconds at level 4. However, it may also be that explicit confirmation by the user is not required. Thus, after the second ingredient has been completely filled in, food processor 1 may stir at level 4 for 10 seconds by means of its mixing tool in an automated manner.

It may now be necessary to heat the pan of the other household appliance. Controlled by the first recipe step of the second recipe, food processor 1 now selects the control program $P_{HT}$ and the communication channel $K_H$. Controlled by the first recipe step of the second recipe, the user interface T can now be displayed on screen 10 of food processor 1. In addition, a message may appear on screen 10 indicating that the other household appliance is now concerned. The user can now be prompted to confirm that the pan, i.e. the food preparation space, of the other household appliance should be heated. If the user confirms this, food processor 1 causes the pan to heat up according to the control program $P_{HT}$ to the temperature required by the first recipe step of the second recipe. However, it may also be the case that food processor 1 selects the control program $P_{HT}$ and the communication channel $K_H$ caused by the first recipe step of the second recipe and then the other appliance is caused to heat the pan according to the first recipe step of the second recipe.

The further recipe steps of the two recipes are now successively processed in a coordinated sequence until finally the respective food is prepared by food processor 1 and the other household appliance. The example also illustrates that a recipe step can comprise the selection of a control program and a communication channel to control a desired other household appliance.

The user interface unit 12 is configured such that other user interfaces can be added to user interface unit 12. It is also possible to remove a user interface. The control unit 13 is configured such that other control programs can be added to control unit 13. It is also possible to remove a control program. The communication unit 14 is configured such that other communication channels can be added to communication unit 14. It is also possible to remove a communication channel. This makes it possible to integrate a further household appliance. For integration of a further household appliance, it may be sufficient to add a communication channel for this further household appliance to communication unit 14 and a control program to control unit 13. Then, food processor 1 can control the next household appliance by means of the added control program and communication channel via the interface intended for connection.

Food processor 1 can comprise a linking unit stored in food processor 1. By the stored linking unit, for example, the user interface T can be linked to the control program $P_{HT}$ and the communication channel $K_H$. The linking unit can be realized as HTML page. Opening this HTML page and thus displaying the HTML page on screen 10 can be carried out by a recipe.

Figure 3:
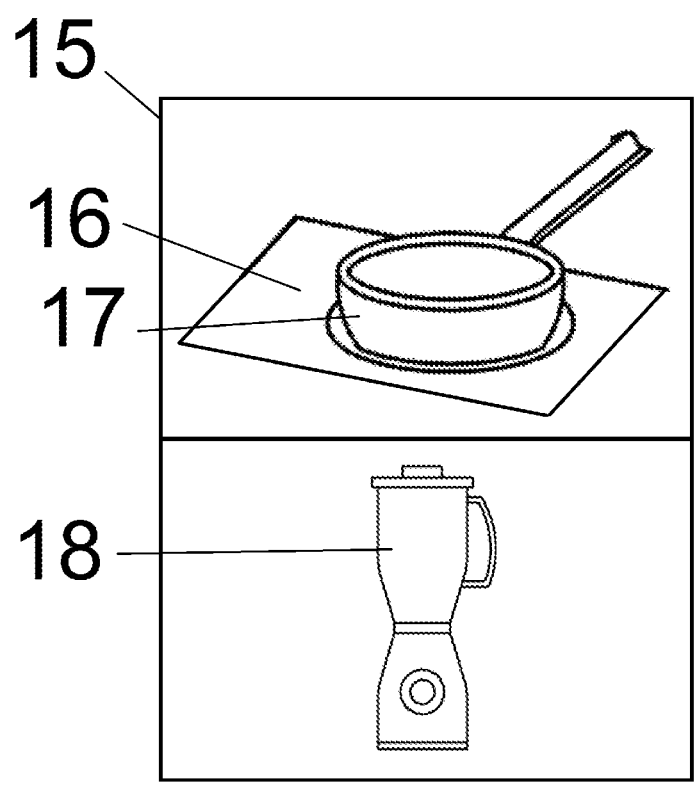
FIG. 3: Other household appliances.

As shown in FIG. 3 in an exemplary manner, the food processor may comprise a user interface which provides a list 15 from which integrated household appliances can be selected. For example, a household appliance comprising a hob and pan is integrated. List 15 therefore shows a hob 16 with a pan 17. For example, a next household appliance, namely a tea maker, is integrated. List 15 therefore comprises the representation of a tea maker 18.

If in one configuration the household appliance with the hob 16 and pan 17 shown in FIG. 3 is selected from the list shown in FIG. 3, this may result in the activation of the aforementioned stored link. The user interface T will then be displayed on the screen. By means of the control program $P_{HT}$ linked thereto and the communication channel $K_H$ linked thereto, e.g. the temperature of the selected household appliance can be set by means of the interface T.

If in one configuration the household appliance with the hob and pan shown in FIG. 3 is selected from the list shown in FIG. 3, this may result in another list being displayed first, from which, for example, T and W can be selected because the other household appliance with the hob and pan also has an integrated scale.

If, for example, the user interface T is subsequently selected, the user interface T is subsequently displayed on screen 10. A temperature T can then be set manually on the household appliance with the hob and pan. The same applies when selecting the user interface W.

The food processor comprises a food preparation space. The food preparation space can be a completely enclosed space. The food preparation space may have openings through which for example ingredients can be added. The food preparation space can be a vessel. There may be a lid for the vessel. The lid may have an opening to allow ingredients to be filled into the vessel through the opening in the lid. There may be a closure to close the opening in the lid. The closure may consist of a transparent material to allow a view into the vessel at any time. The closure can be designed as a receptacle to be able to use the closure for dosing ingredients.

The food processor may comprise a closing mechanism to connect the above-mentioned lid to the vessel in an undetachable manner. The food processor may comprise a motor to open and close the closing mechanism. The food processor may comprise a control program to control the closing mechanism. The food processor may comprise a communication channel for the motor of the closing mechanism to control the operation of the motor by means of the control program for the closing mechanism, thereby controlling the opening and closing of the closing mechanism.

The food processor may comprise one or more devices for preparing a food. A heating device by means of which the food preparation space can be heated may be provided as device for preparing a food. The food processor may comprise a control program by means of which the heating of the food preparation space can be controlled. The heating device may comprise an electric resistance heater to be able to generate heat. The heating device may comprise a temperature sensor to detect, display and/or control temperatures.

As a food preparation device, a stirring tool driven by a motor by means of which a food or ingredients for a food can be stirred and/or chopped a in the food preparation space may be provided. The food processor may comprise a control program by means of which the stirring and/or chopping can be controlled.

As a food preparation device, a scale may be provided by means of which the weight of an ingredient or food brought into the food preparation space can be weighed. The food processor may comprise a control program by means of which the scale and thus the weighing can be controlled.

As a food preparation device, an optical sensor may be provided by means of which an ingredient brought into the food preparation space can be optically monitored. The food processor may comprise a control program by means of which the optical sensor and thus the optical monitoring can be controlled.

The food processor comprises at least one interface for connecting the food processor to another household appliance. By connecting the food processor to another household appliance, data can be exchanged between the food processor and the other household appliance. The preferred interface is a wireless interface. A data transfer can be realized via Wi-Fi or Bluetooth, for example. The interface can provide communication channels to other household appliances or to devices of other household appliances. This makes it possible for the food processor to exchange data, i.e. to communicate, with one or more other kitchen appliances.

The food processor comprises a user interface unit for providing one or more user interfaces. Thus, by means of the user interface unit, one or more user interfaces can be provided. The user interface unit allows to add or remove one or more user interfaces with little technical effort and independently of other units of the food processor. Thus, user interfaces can also be exchanged. By providing the user interface unit in the sense of the present disclosure, user interfaces can be provided and used by the food processor, which do not have to be permanently firmly linked with a control program and a communication channel of the food processor.

The food processor comprises a control unit for providing one or more control programs. Thus, by means of the control unit, one or more control programs can be provided. The control unit makes it possible to add or remove one or more control programs with little technical effort and independently of other units of the food processor. Thus, control programs can also be exchanged. By providing the control unit in the sense of the present disclosure, control programs can be provided and used which do not have to be permanently firmly linked with a user interface of the food processor and a communication channel of the food processor. Therefore, a first user interface can be linked to a first control program. The first user interface can also be linked to a second control program. The first control program can serve for controlling a first other household appliance. The second control program can be used to control a second household appliance. This can be done with little technical effort.

With little technical effort means that the technical effort, for example a programming effort, is lower compared to the effort that would be required in the case of the Thermomix® food processor if the native user interfaces, links or the control program of the Thermomix® food processor were to be changed.

The food processor comprises a communication unit for providing one or more communication channels. Thus, by means of the communication unit, one or more communication channels can be provided. A communication channel allows a data exchange between the food processor and another selected household appliance that is assigned to the communication channel. The communication unit allows to add or to remove one or more communication channels independently of other units of the food processor. Thus, communication channels can also be exchanged. By providing the communication unit in the sense of the present disclosure, communication channels can be provided and used which are not virtually inseparably linked to a user interface and a control program of the food processor. A first communication channel can be linked to a first control program. The first control program serves to control the first other household appliance. The first communication channel can enable a communication between the food processor and the first other household appliance. For example, data can be exchanged between the food processor and the first other household appliance to control and/or operate the first other household appliance by means of the food processor. A second communication channel can be linked to a second control program. The second control program serves to control the second other household appliance. The second communication channel can enable a communication between the food processor and the second other household appliance. For example, data can be exchanged between the food processor and the second other household appliance. The second household appliance can then be operated and/or controlled by means of the food processor.

Through the user interfaces that can be provided by the food processor, other household appliances or devices of other household appliances can be operated. Alternatively or additionally, information about the status of the other household appliance can be displayed through the user interface. To achieve this, the food processor comprises the control unit, the communication unit and the at least one interface for connecting the food processor to another household appliance. If household appliance which is previously unknown to the food processor is to be operated via the food processor, a control program for the previously unknown household appliance can be added to the control unit. A communication channel can be added to the communication unit, which enables communication between the food processor and the previously unknown household appliance. Compared to the state of the art described above, it is possible to use or retrofit a food processor to operate other household appliances without having to make an excessive technical effort. By using user interfaces that are provided by the food processor, user interfaces can be standardized with little technical effort, which can simplify the handling even of previously unknown household appliances. If a user is familiar with the food processor, this reduces the learning effort for the user if he wants to add another household appliance to his household. It also reduces the number of appliances or devices that have to provide user interfaces for operation.

The subject-matter of claim 1 allows the food processor to be used for controlling other household appliances. It is thus possible to coordinate the operation of the food processor with the operation of another household appliance. This can be used, for example, to prepare a meal consisting of different foods. The food processor can entirely or predominantly produce a first food. The other household appliance can entirely or predominantly produce a second food. The food processor can control the production of the two foods in such a way that the time required to prepare the foods is minimized. In addition, the food processor can control the production of the foods such that they are finished at the same time or essentially at the same time.

In addition, the food processor may be wholly or partially as the Thermomix® food processor known from the state of the art as described above. Therefore, a graphical user interface that is natively linked to a scale of the food processor can be displayed on the Thermomix® food processor screen when the scale function is activated. The graphical user interface for the food processor scale and the control program used for the scale can therefore still form a native unit. The same applies to other devices of the food processor such as the stirring tool and heating device. Thus, in this case, there are also links between user interfaces and devices of the food processor, which are technically independent of the user interface unit, control unit and communication unit. These links therefore do not relate to another household appliance. However, it is also possible to technically operate and control the food processor in the same way as with other household appliances. Native programming with fixed links between control program and user interfaces is therefore not necessary.

In an embodiment, the food processor comprises a linking unit configured such that it establishes a link between a user interface of the user interface unit, a control program of the control unit and/or a communication channel of the communication unit.

Regularly it is possible to link a control program with a user interface and a communication channel by means of copy & paste.

The linking unit can be realized in form of a HTML. The HTML page then basically comprises three functions. The first function of the HTML page is a graphical representation that the user views. The graphical representation is then the user interface. The graphical representation can be used to operate the other household appliance and/or to display one or more operating parameters of the other household appliance. The HTML page comprises as a second function the provision of a chosen communication channel. It is thus determined by means of the HTML page with which other household appliances communication can take place. The HTML page comprises as a third function the provision of a selected control program. It is thus determined by means of the HTML page which other control program is used to control and/or operate the other household appliance.

The separate structure makes it possible to edit the individual functions separately. Thus, the control program can be programmed independently of the other two areas. This makes it easy to implement another household appliance.

In an embodiment, the user interface unit of the food processor provides a plurality of user interfaces selected from:
  User interface (W) for a scale,
  User interface (R) for a stirring speed of a stirring tool,
  User interface (T) for a temperature in a food preparation space (2), User interface for a period of time,
User interface for a point in time,
User interface for a fan,
User interface for the power of an infrared heater,
User interface for the power of a microwave radiation.

Thus, one or more user interfaces are available, which make it possible to operate another household appliance or at least a device of another household appliance. Alternatively or additionally, information e.g. about the status of the other household appliance can be displayed through the user interface.

In one embodiment, a linking unit links a first user interface with a first control program and a first communication channel. In addition, a linking unit links the first user interface with a second control program and a second communication channel. A first user interface is thus used twice. This reduces the technical effort for production. In addition, the operation and/or control can be standardized in this way, which keeps the learning effort for a user low.

In one embodiment of this disclosure, the food processor comprises a control program for the food processor and further one or more control programs selected from:
Control program for a food processor comprising a frying pan (17),
Control program for a microwave oven,
Control program for a coffee machine,
Control program for an oven,
Control program for a washing machine,
Control program for a dryer.

According to the control program selected in addition to the control program for the food processor, a food processor comprising a frying pan, a microwave oven, a coffee machine, an oven, a washing machine and/or a dryer can be controlled and/or operated and/or a relevant status can be displayed.

In one embodiment of the present disclosure, the communication unit provides one or more communication channels selected from:
Communication channel for a food processor comprising a frying pan (17),
Communication channel for a microwave oven,
Communication channel for a coffee machine,
Communication channel for an oven,
Communication channel for a washing machine,
Communication channel for a dryer.

Depending on the selected communication channel, the food processor can exchange data and, thus, information with another food processor comprising a frying pan, a microwave, a coffee machine, an oven, a washing machine or a dryer.

Preferably, the food processor comprises a screen for optically displaying a user interface. The food processor is configured such that it can display on the screen a user interface for the food processor and a user interface for the other household appliance. For example, the user interface for the food processor can be displayed on the screen at the same time as the user interface for the other household appliance. If a user interface for the food processor is displayed on the screen, this does not exclude the possibility that other information is additionally displayed on the screen. In one embodiment of this disclosure, different user interfaces are only alternately displayed on the screen in order not to overload the screen too much with information and operating possibilities.

A user interface in the sense of the present disclosure also comprises the case that control is performed by speech and/or gestures and/or that a user of the food processor receives information acoustically via a loudspeaker.

In an embodiment of the present disclosure, the food processor is configured such that it can prepare a food in an at least semi-automated manner and that it can control the other household appliance in such a way that the other household appliance can prepare a food in an at least semi-automated manner. In this embodiment, the food processor not only ensures that operating parameters of the food processor are set in an automated manner, but in addition the food processor also ensures that operating parameters of the other household appliance are set in an automated manner. If two different foods are produced, the settings are based on recipes that the food processor can access.

In an embodiment of the present disclosure, the food processor is configured such that food can be prepared in an at least semi-automated manner by the food processor and the other household appliance simultaneously or overlapping in time. This embodiment makes it possible to prepare a meal comprising several foods in a short time.

In an embodiment of the present disclosure, the food processor is configured such that it can process a recipe for the preparation of a food in the food processor and a recipe for the preparation of a food in the other household appliance. A recipe comprises in particular several recipe steps which are successively processed for the preparation of a food. As a recipe step, a recipe comprises in particular the addition of an ingredient to the associated food preparation space. A recipe comprises as a recipe step in particular the stirring and/or chopping of a food or at least one ingredient of a food, preferably for a fixed period of time and/or preferably at a fixed speed of rotation of the stirring tool. Preferably the fixed period of time is set in an automated manner by the food processor. Preferably the speed of rotation is set in an automated manner by the food processor. A recipe comprises as a recipe step in particular the heating of a food or at least the heating of an ingredient of a food, preferably for a fixed period of time and/or preferably at a fixed temperature. Preferably the fixed period of time is set in an automated manner by the food processor. Preferably the temperature is set in an automated manner by the food processor. A recipe comprises as a recipe step in particular the turning of a food or an ingredient of a food. For example, a food can comprise a steak or another piece of meat. The recipe step can then be to turn the piece of meat to another side.

In one embodiment the food processor comprises a stirring tool for stirring and/or chopping a food in the food preparation space, a scale for weighing an ingredient filled into the food preparation space and/or a heating device for heating the food preparation space.

The present disclosure further relates to a system comprising the food processor according to the description herein and the other household appliance, the other household appliance preferably comprising a hob and a pan. This system provides the most important appliances that are usually required for the preparation of a meal. This is especially true if the food processor comprises a stirring tool for stirring and/or chopping a food in the food preparation space, a scale for weighing an ingredient filled into the food preparation space, and a heating device for heating the food preparation space.

Other examples of household appliances that the system may comprise are a washing machine for washing laundry, a dryer for drying damp laundry, a dishwasher for cleaning dishes, pots, pans and cutlery, a microwave oven for heating a food in a food preparation space using microwaves, an oven for heating a food in a food preparation space using infrared radiation, a steamer for preparing a food using steam, a hob for heating pots or pans and the food in them, a coffee machine for preparing a coffee drink, a tea maker for preparing a tea drink, a refrigerator for cooling of foodstuff, a freezer for freezing of foodstuff, a vacuum cleaner for cleaning by sucking up particles, a wet cleaner for cleaning by a liquid, a steam cleaner for cleaning by steam, an egg boiler for boiling eggs or a waffle iron for preparing waffles in a food preparation space.

The present disclosure further relates to a method for producing a meal. A user selects by means of a food processor according to the disclosure a recipe for a first food and a recipe for a second food. For example, the food processor may display a list on a screen from which the first food and the second food can be selected. The recipe for the first and second foods can be stored in a memory of the food processor. The food processor can also, for example, obtain such recipes via the internet and display them. The two selected recipes are optimized for the food processor and another household appliance in such a way that the two foods can be prepared in a coordinated manner by the food processor and the other household appliance, and in particular in a timely coordinated manner such that both foods can e.g. be completed at a desired time. The two recipes can be optimized by a recipe planning algorithm. The recipe planning algorithm can be stored in the food processor. The recipe planning algorithm can also be saved on the internet. An optimization can also be already stored in the memory of the food processor or in the internet.

Alternatively, a user can select a recipe for a meal comprising a recipe for a first food and a recipe for a second food. Generally, the two recipes for the production of the first food and the second food are then already suitably coordinated in order to be able to produce both foods in an optimized way, by the food processor and the other household appliance.

If the two foods are prepared because, for example, the user has pressed a start button on a touch-sensitive screen, the food processor successively processes recipe steps for the first food and for the second food in a coordinated manner. A recipe step is processed in the known way. For example, a user can be prompted by a recipe step to bring an ingredient into a food preparation space. A recipe step can also comprise that ingredients for a food are processed, for example heated, in a semi-automated manner in a food preparation space of the food processor or other household appliance. For example, the first food can be prepared entirely or predominantly by the food processor. The second food can be prepared entirely or predominantly by the other household appliance. It is at least partially prepared in a timely parallel manner through the coordination of the two recipes for preparing foods.

A food processor may be used to operate and control another household appliance. The term food processor also comprises the case that the food processor includes a, for example, wirelessly connected computer. The computer can be a tablet PC, for example. Graphical user interfaces can then be displayed on the computer screen to control and/or operate the food processor and another household appliance and/or to display operating states. However, it does not necessarily have to be a food processor that can control and operate another household appliance. For example, instead of a food processor, it can also be a washing machine. This makes less sense in many cases, since a washing machine is usually used comparatively seldom and is often located in a cellar room. The other household appliance may also be a combination of an appliance and a computer connected to it, wherein the connection may be wireless.

The present disclosure enables a coordinated cooking or preparing food. This is achieved by using a food processor according to the disclosure herein and another household appliance. First, suitable recipes can be selected and optimized for the food processor and the other household appliance. The optimization can be performed via the internet and thus by an external computer. The optimization can be performed by the food processor. The appliances available for the preparation of foods can be specified manually, for example by the user of the food processor. The food processor can also be configured such that it automatically determines which other household appliances are available for the preparation of food. If the food processor is controlled by native programming, user interfaces based solely on native programming and user interfaces of an HTML page can be displayed on a screen of the food processor. For a user, however, this technical difference is not visible. However, native programming is not mandatory.

If HTML is used, the HTML page may comprise instructions for the other household appliance and instructions for establishing the connection if the connection has not been previously established via the food processor in a suitable place. A connection can be established via Bluetooth, for example. From a programming point of view, the HTML page can be structured in such a way that its three functions, which relate to a user interface, a control program and a communication channel, are separated from each other such that the individual areas of the functions can be edited and programmed separately.

The invention claimed is:

1. A food processor for preparing a food having a food preparation space, the food processor comprising:
   one or more devices for preparing the food in the food preparation space, at least one interface for connecting the food processor to another household appliance,
   a user interface unit for providing user interfaces,
   a control unit for providing control programs, and
   a communication unit for providing communication channels, and
   a screen for displaying a user interface,
   wherein the user interface unit comprises a user interface through which the other household appliance is configured to be operated or which is configured to display a state of the other household appliance,
   wherein the food processor is arranged to display on the screen another user interface for the food processor and the user interface for the other household appliance,
   wherein the control unit comprises a control program configured to serve for controlling the other household appliance, and
   wherein the communication unit comprises a communication channel configured to enable a communication between the food processor and the other household appliance.

2. The food processor of claim 1, wherein the food processor comprises at least one of a linking unit configured to establish a link between the user interface provided by the user interface unit, the control program provided by the control unit, and the communication channel provided by the communication unit.

3. The food processor of claim 2, wherein the linking unit is realized by an HTML page.

4. The food processor of claim 1, wherein the user interface unit provides a plurality of user interfaces selected from user interface for a scale,
user interface for a stirring speed of a stirring tool,
user interface for a temperature in a food preparation space,
user interface for a period of time,
user interface for a point in time,
user interface for a fan,
user interface for the power of an infrared heater, and
user interface for the power of a microwave radiation.

5. The food processor of claim 1, wherein the control unit provides a control program for the food processor and further provides one or more control programs selected from:
control program for a food processor comprising a frying pan,
control program for a microwave oven,
control program for a coffee machine,
control program for an oven,
control program for a washing machine,
control program for a dryer.

6. The food processor of claim 1, wherein the communication unit provides one or more communication channels selected from:
communication channel for a food processor comprising a frying pan,
communication channel for a microwave oven,
communication channel for a coffee machine,
communication channel for an oven,
communication channel for a washing machine,
communication channel for a dryer.

7. The food processor of claim 1, wherein the food processor comprises one or more of a stirring tool for at least one of stirring and chopping a food in the food preparation space, a scale for weighing an ingredient filled into the food preparation space, and a heating device for heating the food preparation space.

8. The food processor of claim 1, wherein the food processor comprises a stirring tool for at least one of stirring and chopping a food in the food preparation space, a scale for weighing an ingredient filled into the food preparation space, and a heating device for heating the food preparation space.

9. The food processor of claim 8, wherein the communication unit provides one or more communication channels selected from:
communication channel for a food processor comprising a frying pan,
communication channel for a microwave oven,
communication channel for a coffee machine,
communication channel for an oven,
communication channel for a washing machine,
communication channel for a dryer.

10. The food processor of claim 9, wherein the user interface unit provides a plurality of user interfaces selected from
user interface for a scale,
user interface for a stirring speed of a stirring tool,
user interface for a temperature in a food preparation space,
user interface for a period of time,
user interface for a point in time,
user interface for a fan,
user interface for the power of an infrared heater, and
user interface for the power of a microwave radiation.

11. The food processor of claim 1, wherein the food processor is configured to prepare a food in a semi-automated manner and to control the other household appliance in such a way that the other household appliance prepares a food in a semi-automated manner.

12. The food processor of claim 1, wherein the food processor is configured to prepare food in an at least semi-automated manner by the food processor and the other household appliance simultaneously or overlapping in time.

13. The food processor of claim 1, wherein the food processor is configured to process a recipe for the preparation of a food in the food processor and a recipe for the preparation of a food in the other household appliance.

14. The food processor of claim 13, wherein the food processor comprises a recipe for a meal composed of a recipe for a first food and a recipe for a second food, wherein both foods are prepared by the food processor and the other household appliance.

15. The food processor of claim 13, wherein the food processor comprises one or more of a stirring tool for at least one of stirring and chopping a food in the food preparation space, a scale for weighing an ingredient filled into the food preparation space, and a heating device for heating the food preparation space.

16. The food processor of claim 15, wherein the food processor comprises a recipe for a meal composed of a recipe for a first food and a recipe for a second food, wherein both foods are prepared by the food processor and the other household appliance.

17. The food processor of claim 13, wherein the food processor is configured such that the first food is produced entirely or predominantly by the food processor and the second food is produced entirely or predominantly by another household appliance.

18. A system comprising a food processor and a secondary food processor,
the food processor including a food preparation space with one or more devices for preparing the food in the food preparation space, at least one interface for connecting the food processor to another household appliance which includes the secondary food processor, and a user interface unit for providing user interfaces, with a control unit for providing control programs (PHT), with a communication unit for providing communication channels (KH), and a screen for displaying a user interface,
wherein the user interface unit comprises a user interface through which the other household appliance is configured to be operated or which is configured to display a state of the other household appliance,
wherein the food processor is arranged to display on the screen other user interface for the food processor and the user interface for the other household appliance,
wherein the control unit comprises a control program configured to serve for controlling the other household appliance,
wherein the communication unit comprises a communication channel configured to enable a communication between the food processor and the other household appliance, and
wherein the secondary food processor comprises a hob and a pan.

* * * * *